United States Patent [19]

Hester

[11] 3,926,358
[45] Dec. 16, 1975

[54] APPARATUS AND METHOD FOR DEFORMING TUBING FOR ULTRASONIC WELDING OF THE TUBING TO A PLANAR STRUCTURE

[75] Inventor: William F. Hester, Louisville, Ky.

[73] Assignee: General Electric Company, Louisville, Ky.

[22] Filed: Jan. 7, 1975

[21] Appl. No.: 539,245

[52] U.S. Cl. .............. 228/111; 228/173; 228/212; 228/44.1; 29/157.3 C; 29/202 D; 156/580
[51] Int. Cl.² .................................. B23K 19/04
[58] Field of Search ....... 29/157.3 C, 202 R, 202 D; 228/110–111, 212, 1, 44.1; 156/73.1, 73.2, 580

[56] References Cited
UNITED STATES PATENTS

| | | |
|---|---|---|
| 2,666,981 | 1/1954 | Sandberg .......................... 29/157 C |
| 2,691,813 | 10/1954 | Polad ................................ 29/157 C |
| 2,795,035 | 6/1957 | Kafer ................................ 29/157 C |
| 3,184,841 | 5/1965 | Jones et al. .......................... 228/110 |
| 3,429,028 | 2/1969 | Maropis et al. ...................... 228/110 |
| 3,514,834 | 6/1970 | Beck ................................. 29/202 R |

Primary Examiner—Al Lawrence Smith
Assistant Examiner—K. J. Ramsey

[57] ABSTRACT

Method and apparatus for deforming tubing to a preselected configuration and urging the deformed tubing and a planar structure into forcible contact with one another ultrasonically welding the deformed tubing to the planar structure.

8 Claims, 4 Drawing Figures

APPARATUS AND METHOD FOR DEFORMING TUBING FOR ULTRASONIC WELDING OF THE TUBING TO A PLANAR STRUCTURE

BACKGROUND OF THE INVENTION

Many of today's refrigerators utilize what is called a sheet and tube evaporator. In this type evaporator, tubing for refrigerant is attached to a metal sheet. The metal sheet is generally formed of aluminum. The aluminum sheet serves as a secondary heat exchange surface to dissipate heat from within the tubing. It is therefore important that the tubing be in intimate contact with the sheet in order to provide effective heat exchange.

Heretofore, the tubing has been attached to the planar sheet by various means such as furnace brazing, adhesive bonding, and mechanically fastening with clips, tabs, crimps, and the like.

The use of ultrasonic welding for attaching the tubing to the sheet was considered particularly advantageous because it provides an intimate bond, is rapid, and avoids waste of attaching materials. However, the application of ultrasonic welding requires forcible contact between the pieces being welded at pressures which heretofore have damaged the tubing This invention, therefore, resides in apparatus and method for deforming the tubing and maintaining the tubing in sufficient intimate contact with the sheet for ultrasonically welding the tubing to the sheet.

SUMMARY OF THE INVENTION

In accordance with this invention, apparatus and method are provided for urging and deforming tubing against a planar structure and maintaining the deformed tubing against the structure during ultrasonic welding of the tubing to the structure. An elongated pressure block has a first surface and a groove extending across the first surface for receiving the tubing. The groove has a bottom portion of first, second, and middle portions and has first and second side portions. The bottom portion of the groove is of generally arcuate configuration about a major axis of the groove. The first and second portions of the bottom portion are of arcuate configuration about respective minor axes that are each positioned laterally on opposed sides of the major axis and spaced from the major axis a distance in the range of 0.9% to 2.9% of the outside diameter of the tubing. Each first and second groove portion has a common radius in the range of 48% to 52% of the outside diameter of the tubing. The middle portion of the groove bottom portion is at a depth substantially equal to the greatest depth of said first and second groove portions and in the range of 70% to 90% of said tubing outside diameter. The groove side portions each extend outwardly from the respective first and second groove portions at an angle in the range of about 5° to about 25° from the vertical.

DETAILED DESCRIPTION OF THE INVENTION

Figure 1:
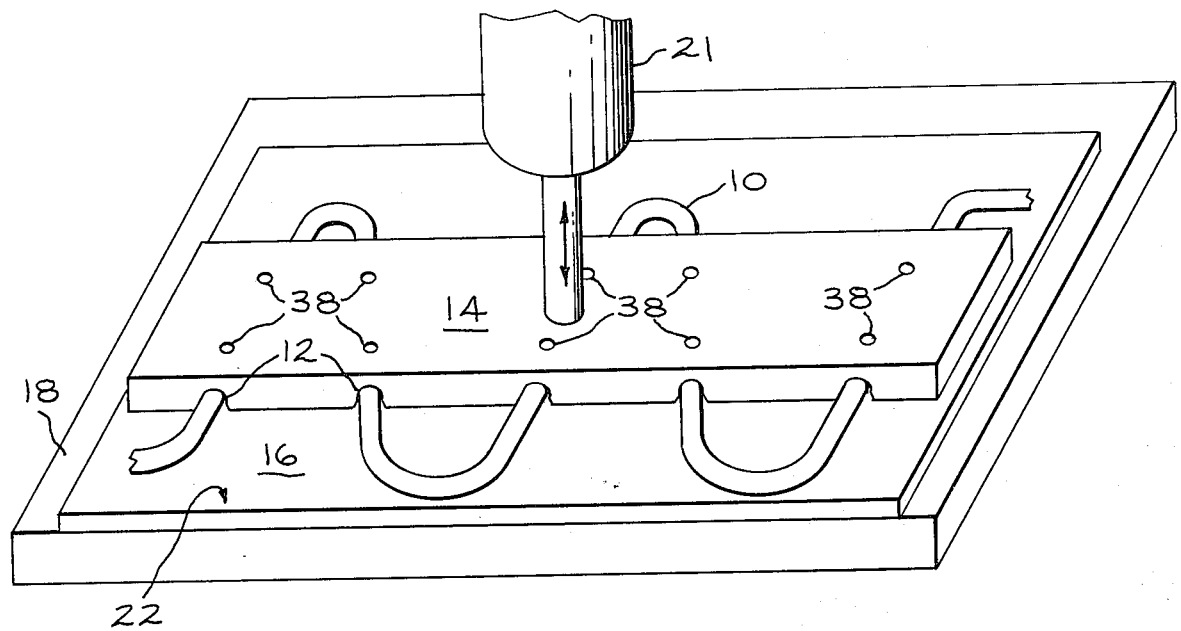
FIG. 1 is a perspective view of tubing being attached to a sheet by ultrasonic welding using the apparatus of this invention.

In the embodiment of FIG. 1, a tubing 10 of serpentine configuration is positioned in grooves 12 of a pressure block 14 of this invention with the tubing in contact with a metal sheet 16. The metal sheet 16 can be supported by a table 18 or other structure which provides an access for the welding horn 20 (FIG. 3) of the ultrasonic welding apparatus to be placed on an opposed side of the sheet adjacent the tubing portion to be ultrasonically welded. Means 21, such as a power cylinder, is connected to the pressure block 14 for urging the first surface 22 of the pressure block 14 and the sheet 16 into forcible contact one with the other. It should be understood, however, that the means 21 can be connected to the table and the pressure block 14 can be restrained, or any other order can be provided to urge the sheet 16 and pressure block 14 toward one another, without departing from this invention.

Figure 2:
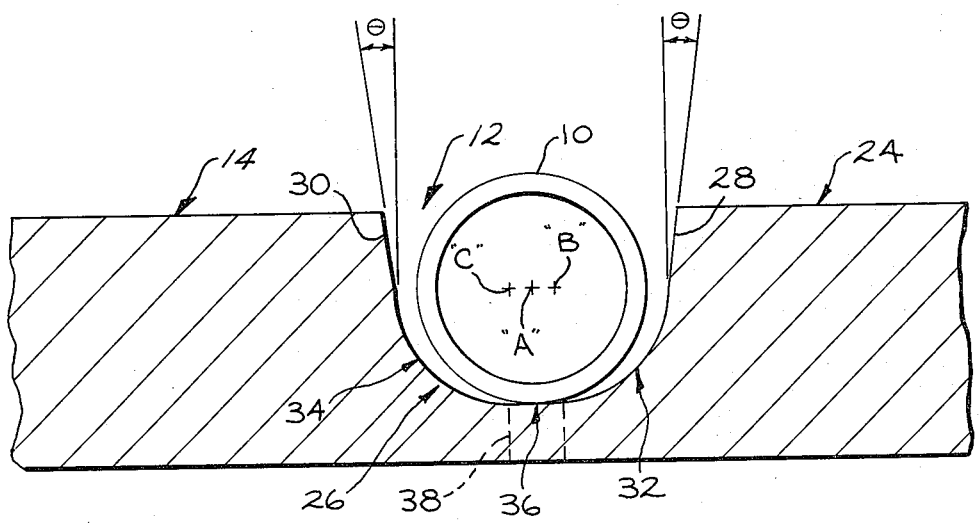
FIG. 2 is a diagrammatic cross-sectional view of a portion of a pressure block of this invention.

Referring to the embodiment of FIG. 2, the pressure block 14 has a first surface 24 having a groove 12 of preselected configuration extending thereacross. The groove 12 has a bottom portion 26 and first and second side portions 28, 30. The bottom portion 26 of the groove 12 is of a generally arcuate configuration about a major axis A and has first, second, and middle portions 32, 34, and 36.

The first and second portions 32, 34 of the bottom portion 26 of the groove 12 are each of arcuate configuration about a respective minor axis B and C. Each minor axis B and C are positioned laterally from and extend substantially parallel to the major axis A. The minor axes B and C are positioned on opposed sides of the major axis A and are each spaced a substantially common distance from said major axis A in the range of 0.9 to 2.9% of the outside diameter of the tubing 10 to be deformed by the method of this invention. Further, each of the first and second portions 32, 34 of the bottom portion 26 have a substantially common radius that is in the range of about 48% to about 52% of the outside diameter of the tubing 10 to be deformed by the method of this invention.

The middle portion 36 of the bottom portion 26 of the groove 12 has a depth, as measured from the first surface 24 of the pressure block 14, substantially equal to the greatest depth of the adjacent first and second portions 32, 34 and in the range of 70% to 90% of said tubing outside diameter.

Each of the first and second side portions 28, 30 of the groove 12 extend upwardly and outwardly from the respective first and second bottom groove portions 32, 34 at an angle in the range of about 5° to about 25° from the vertical.

The middle portion 36 of the bottom portion 26 of the groove 12 can have openings 38 extending therethrough for receiving a "punch out" tool for assisting in removing the deformed tubing from the pressure block 14. There can also be a plurality of these grooves 12 of common configuration extending across the block and being spaced one from the other, as better seen in FIG. 1.

An example pressure block that can be used for ultrasonically welding aluminum tubing to an aluminum sheet is as follows:

Example
Tubing .794 Cm. OD
.59 Cm.ID
Pressure Block
Number of grooves 8
(extending across width
of pressure block)
Thickness of first and second
side portions (28, 30) .396 Cm.
Angle of first and second side
portions (28, 30) from vertical 7°
Radius of first and second
bottom portions (32, 34) .397 Cm.
Spacing of each axis "B" and
"C" from major axis "A" .0127 Cm.
Width of middle portion 36 .0254 Cm.

In the method of this invention, portions of the serpentine tubing are inserted in the grooves 12 of the pressure block 14. The tubing 10 in the pressure block 14 and the sheet 16 are urged together by the power means 21.

Figure 3:
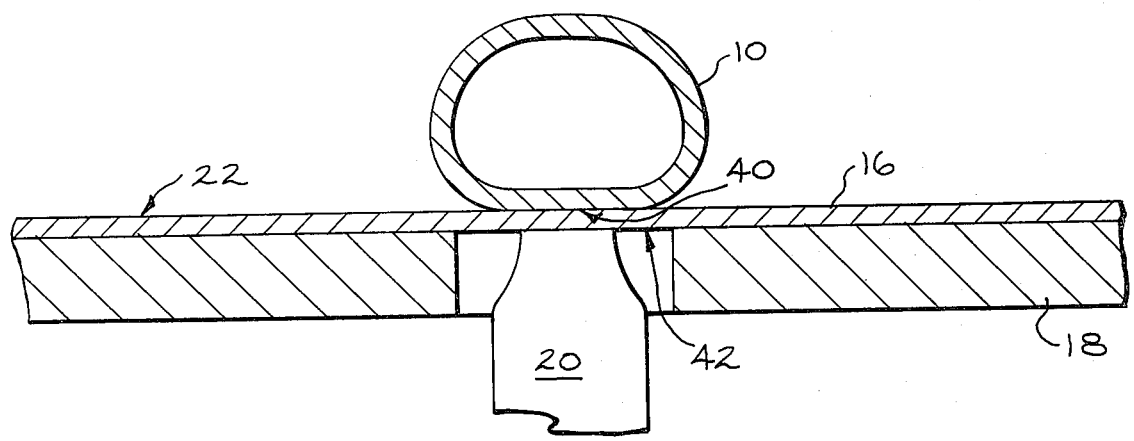
FIG. 3 is a diagrammatic cross-sectional view of the tubing ultrasonically welded to the planar sheet.

Referring to FIG. 3, the forcible contact of the tubing 10 with the sheet 16 deforms a first side 40 of the tubing 10 into a planar surface while deforming other portions of the tubing into the preselected curvilinear configuration of the bottom portion 26 of the groove 12.

The deformed tubing is maintained in forcible contact with the sheet 16 while the sheet is ultrasonically welded, as is known in the art, by an ultrasonic welding horn 20 contacting the opposed second surface 42 of the sheet 16.

The force for deforming the tubing 10 is dependent upon the properties, wall thickness, diameter of the tubing, and the configuration of the groove 12. Once these variables have been determined, one skilled in the art can easily determine the required force. It is preferred, however, that the tubing be deformed to an extent that the planar first side portion 40 of the deformed wall have a width of at least 30% of the outside diameter of the undeformed tubing and that the inside volume of the deformed tubing be greater than 80% of the inside volume of a common portion of the nondeformed tubing.

Figure 4:
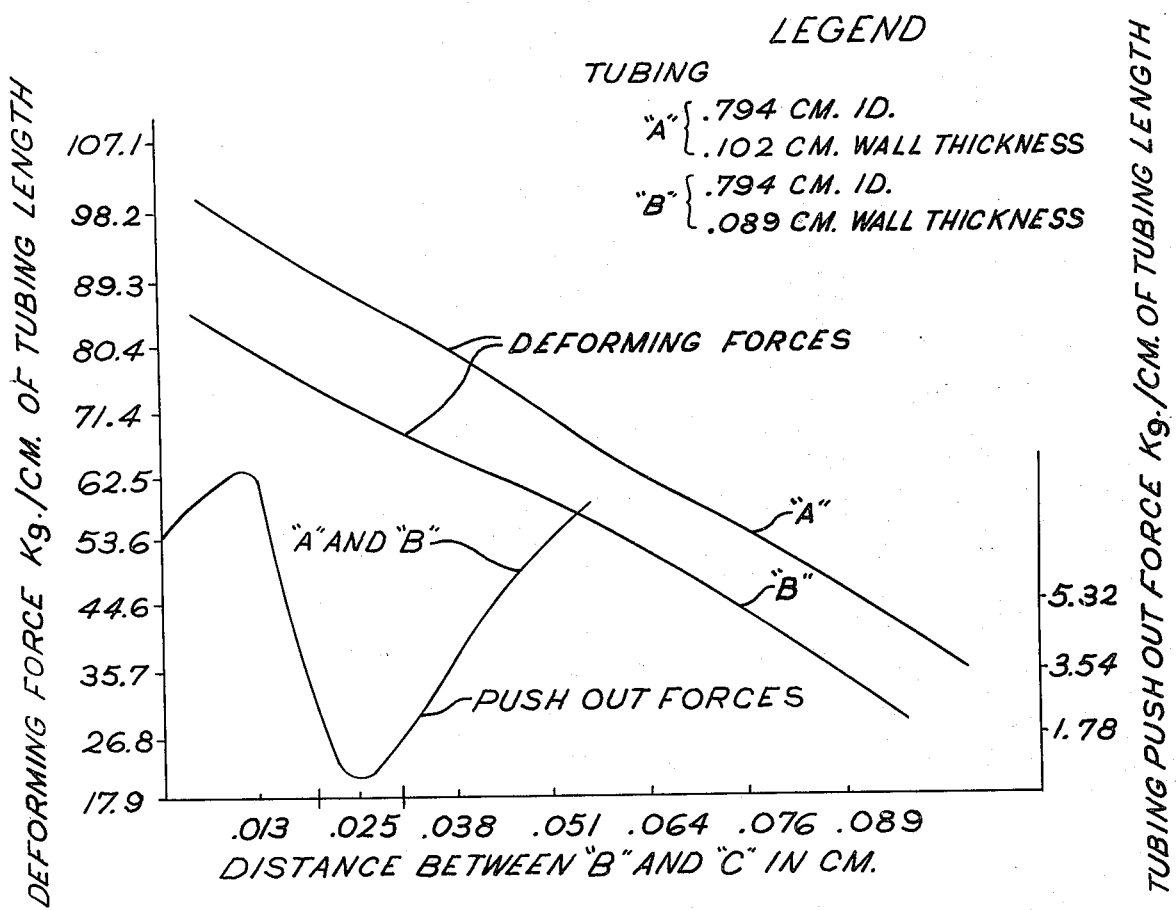
FIG. 4 is a graph of forces required to deform tubing with and remove the deformed tubing from the pressure block of this invention.

Referring to FIG. 4, it has been discovered that with the distance between the minor axis B and C maintained at a total distance in the range of 1.9% to 5.8% of the outside diameter of the undeformed tubing, there is a synergistic dip in the force required to remove the deformed tubing from the pressure block. As shown for tubing A and B, the required push-out force is in the range of 1.36 to 5.32 Kg/Cm of tubing length. Where greater push-out forces are required, the deformed ultrasonically welded tubing can be damaged during removal from the pressure block. Further, it has been determined that if the angle of the first and second side groove portions 28, 30 is greater or less than the above-cited range, the resultant deformed tubing will be respectively, undesirably decreased in volume or will require additional forces to remove it from the pressure block.

Further, if the maximum depth of the middle portion 36 is greater or less than the above range, the resultant deformed tubing will respectively have a planar surface that is of an undesirable width or the volume of the resultant deformed tubing will be undesirably decreased.

By so constructing the apparatus of this invention and deforming the tubing by the method of this invention, it has been discovered that tubing can be successfully and rapidly supported for ultrasonically welding to a sheet material.

Other modifications and alterations of this invention will become apparent to those skilled in the art from the foregoing discussion, and it should be understood that this invention is not to be unduly limited thereto.

What is claimed is:

1. Apparatus for urging and deforming a tubing against a structure and maintaining the deformed tubing against the structure during ultrasonically welding of the tubing to the structure, comprising:
a pressure block having first surface having a groove of preselected configuration extending across said first surface, said groove having a bottom portion and side portions, said bottom portion being of generally arcuate configuration about a major axis of the groove and having first, second, and middle portions, said first and second groove bottom portions being of arcuate configuration about a respective minor axis spaced laterally from and on opposed sides of the major axis a distance in the range of about 0.9% to about 2.9% of the outside diameter of the tubing to be deformed with the pressure block and each having a common radius in the range of 48% to 52% of said tubing outside diameter, said groove middle portion being at a depth substantially equal to the greatest depth of the adjacent first and second groove bottom portions and in the range of 70% to 90% of said tubing outside diameter and each of said groove side portions extending outwardly from the respective first and second groove bottom portions at an angle in the range of about 5° to about 25° from the vertical.

2. Apparatus, as set forth in claim 1, wherein the middle portion of the bottom portion has an opening extending through the block.

3. Apparatus, as set forth in claim 2, wherein the block has a plurality of spaced-apart grooves of common configuration.

4. Apparatus, as set forth in claim 1, wherein the block has a plurality of spaced-apart grooves of common configuration.

5. Apparatus, as set forth in claim 1, including means for placing the first surface of the pressure block and the structure into forcible contact one with the other.

6. A method for deforming tubing and maintaining tubing in forcible contact with the structure for ultrasonically welding the tubing to the structure, comprising:
inserting the tubing in a groove of a pressure block;
urging the tubing in the block against the structure;

deforming a first side of the tubing into a planar surface in contact with the structure while deforming other portions of the tubing into a preselected curvilinear configuration by urging the tubing in the block against the structure with a preselected force; and maintaining the deformed tubing in forcible contact with the structure for ultrasonically welding the planar surface of the deformed tubing to the structure.

7. A method, as set forth in claim 6, wherein the tubing is deformed to a configuration at which the planar portion has a width at least 30% of the outside diameter of the tubing.

8. A method, as set forth in claim 6, wherein the inside volume of the deformed portion of the tubing is greater than 80% of the inside volume of a common portion of the non-deformed tubing.

* * * * *